INVENTORS.
Andrew L. Lawson
Joseph J. Maurin
BY

Andrus & Starke
Attorneys

United States Patent Office 3,105,808
Patented Oct. 1, 1963

3,105,808
SHELL FOR FLUID-COOLED REACTORS
Andrew L. Lawson and Joseph J. Maurin, Milwaukee, Wis., assignors, by mesne assignments, to Chicago Bridge & Iron Company, Oak Brook, Ill., a corporation of Illinois
Filed Aug. 1, 1960, Ser. No. 46,538
6 Claims. (Cl. 204—193.2)

This invention relates to a housing for a fluid-cooled atomic reactor and is particularly directed to a reactor shell of the multi-layer variety.

An atomic reactor generally includes an atomic core which is housed within a suitable high-strength housing. Water, helium or other suitable fluid passes into the housing and over the core. The water is heated by atomic energy and thus constitutes the energy transmitting medium. The heated water passes between the core and the housing and is discharged from the housing as a source of energy.

The water or other medium is heated by the admission of neutrons, gamma and other particles which are emitted from the core. Some of the heating particles will pass through the water and penetrate into the wall of the reactor housing. The temperature of the wall thus increases substantially immediately adjacent the core. Preferably, the heat so generated is conducted back into the interior of the vessel and is employed to further the temperature of the water.

The outer housing must necessarily have a relatively high strength and consequently a multi-layer construction, such as generally shown in Patent No. 2,365,696, is desirable. As shown therein, a multi-layer vessel generally includes a series of contacting concentric members which are individually relatively thin. The individual members are assembled tightly one about the other and the ends are welded to end members to complete the pressure housing or vessel.

In the multi-layer construction, the coaxially, superimposed members inherently have minute air spaces between the members due to the imperfections in the surfaces in the adjacent surfaces as well as due to manufacturing tolerances. Such air spaces constitute heat barriers and when such a structure is employed in an atomic reactor, the heat barriers would tend to oppose the flow of heat from the housing back into the water.

The present invention is based upon the fact that the heating effect varies exponentially with the distance from the core and that a solid wall member more readily transmits its heat than a laminated structure.

Generally in accordance with the present invention, a multi-layer vessel or housing is provided having an inner relatively deep or thick solid wall member integrally interconnected with individual end layers. The wall member's depth equals a plurality of the individual layers and is positioned within the housing in alignment with the reactor core. The wall member is formed with stepped ends to provide means for attaching end layers in a manner creating a high strength multi-layer vessel construction. The housing is completed by a series of outer layers which extend the complete length of the shell.

The solid wall portion readily transmits the heat established by the absorption of the previously described particles emitted by the reactor core. The heating effect drops exponentially with the distance of the wall from the core and consequently the stepped end construction does not appreciably affect the efficiency of heat return. The solid wall member for the same reason need only be a small fraction of the total thickness of the outer housing and consequently the strength of the multi-layer vessel is not appreciably affected.

The drawing furnished herewith illustrates the best mode presently contemplated for carrying out the invention.

Figure 1:
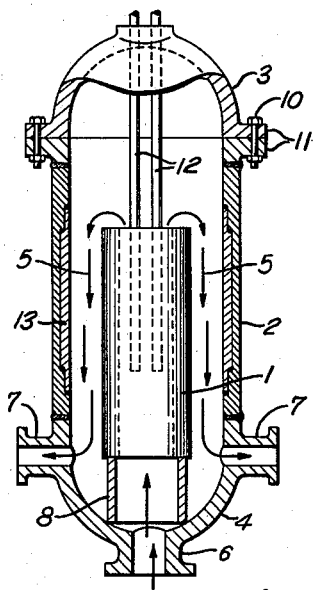
FIG. 1 is a longitudinal section through a simplified illustration of a water-cooled atomic reactor.

Referring to the drawings, and particularly to FIG. 1, an atomic reactor unit is illustrated including an atomic core 1 which is mounted within an outer tubular housing or shell 2. An upper end wall 3 is removably secured to the upper end of the tubular shell 2 and a lower end wall 4 is secured to the lower end of the shell 2. Water 5 continuously flows through the shell 2 and over the core 1 to absorb heat from the atomic energy in the core 1 and thus constitutes a heat or energy transfer medium.

The atomic core 1 is a tubular member of standard construction and no further description thereof is given. The core 1 is adapted to emit neutron, gamma particles and the like which heat the water 5 which is shown diagrammatically by the arrows.

The lower end wall 4 is generally an inverted bell-shaped member having a central water inlet 6 and a series of water outlets 7 circumferentially spaced about the upper circumference of the wall. The end wall 4 is welded or otherwise secured to the lower end of the tubular shell 2.

A mounting means 8 is secured within the lower end of the end wall 4 and supports the core in slightly vertically spaced relation to the water outlets 7 of wall 4 and coaxially spaced from shell 2. The mounting means 8 also constitutes a fluid passage connecting the water inlet 6 to the core 1. The water inlet 6 is connected to cold incoming water to be heated by the energy in the core 1. The water 5 flows upwardly through core 1 and falls downwardly in the space between shell 2 and core 1. The water 5 is thus heated and passes outwardly through the water outlets 7 which are provided in the upper portion of the end wall 4. The water 5 leaving through outlets 7 is at a very high temperature and constitutes a source of energy.

The upper end wall 3 is removably secured to the upper end of the shell 2 by a plurality of bolt units 10 which project through aligned flanges 11 on shell 2 and wall 3.

A series of control rods 12 are journaled in the upper end wall 3 for axial movement through the shell 2 and into the core 1. The control rods 12 regulate the activity of the core 1 and therefore control the rate of heating of the water 5.

As previously noted the core emits certain rays or particles which heat the water 5. Certain of these energy particles pass through the water and are absorbed by the adjacent shell 2. The energy is given up to the shell in the form of heat. The energy distribution decreases exponentially with distance from the core 1 and consequently appreciable heating of the shell 2 is only established immediately adjacent the core 1 and then for only a partial depth of the shell 2.

Figure 2:
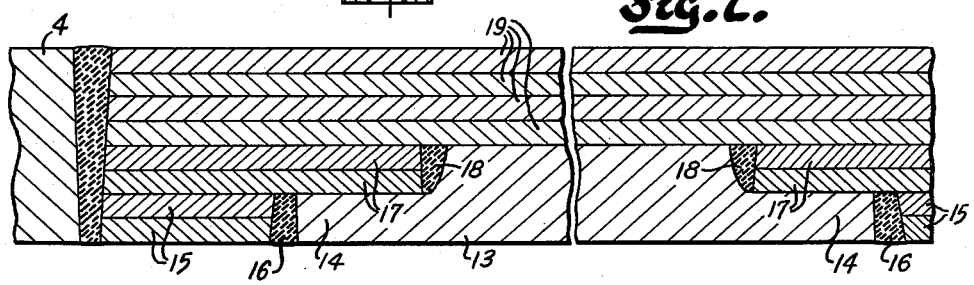
FIG. 2 is an enlarged fragmentary view showing a shell construction immediately adjacent the core of the reactor in accordance with the present invention.

Referring particularly to FIG. 2, an enlarged fragmentary view of the shell 2 which is adjacent core 1 and which is constructed in accordance with the present invention is illustrated.

A solid inner wall 13 having stepped ends 14 is provided generally coextensive of the core 1. A first series of cylindrical inner layers 15 are secured to the outermost ends of the stepped ends 14 by suitable welds 16. The series of layers 15 are of sufficient length to complete the length of the shell 2 and the thickness of the individual layers is selected such that a smooth continuous cylindrical surface is established coincident with the circumferential surface of the first step in the solid inner wall 13.

A second series of cylindrical laminae or layers 17 are close fitted about the first series of layers 15 and the extended surface of the step of the inner wall 13 by welds 18. The second series of layers 17 are of sufficient length to extend for the length of the shell 2 and are of a thickness to establish a smooth, circumferential surface with the outer periphery or circumference of the inner wall 13. A series of continuous outer layers 19 are close fitted over the above sub-assembly and extend for the complete length of the shell 2 to build up the thickness of the shell to the required strength for suitable housing of the reactor core 1.

The flange 11 is welded to the upper end of the shell 2 to permit removable attachment of the upper end wall 3. The lower bell-shaped end wall 4 is welded directly to the opposite end of the shell 2.

The energy particles which are emitted by the atomic core 1 and which pass through the water 5 and enter the shell 2 are primarily concentrated within the solid inner wall 13 because of the exponential distribution of the energy particles.

The step construction creates a high-strength vessel and is permissible because of the decrease in heating effect with distance. Thus the removed portion forming the stepped end 14 is substantially removed from the central portion of the core 1 and the heating effect with respect to the energy particles from the central portion of the core is practically low.

The particles transmitted and absorbed by the inner wall 13 results in a noticeable increase in the temperature of the wall. However, the heat is readily transmitted through the wall 13 and back into the water 5 which continuously flows along the wall.

The present invention provides a reactor housing which retains the high strength of multi-layer construction and includes means for increasing the efficiency of the reactor operation.

Figure 3:
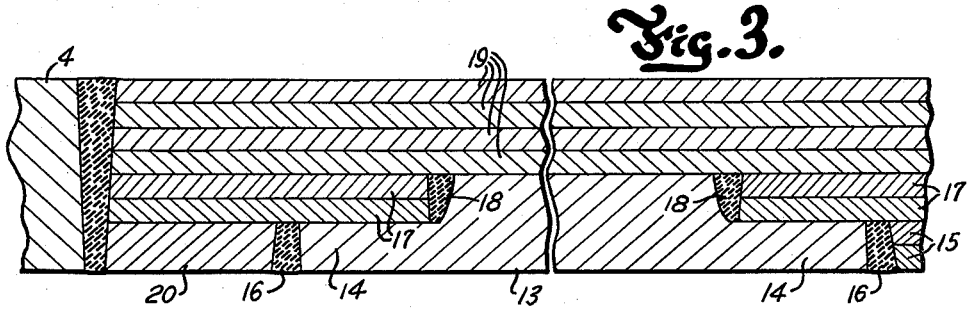
FIG. 3 is a view similar to FIG. 2 showing a modification of the invention shown in FIG. 2.

Referring particularly to FIG. 3, a view similar to FIG. 2 is illustrated and corresponding elements are given corresponding numbers. The embodiment shown in FIG. 3 includes a solid inner end section 20 which is secured as the extension of the innermost portion of the solid inner wall 13 immediately adjacent the core 1. The section 20 corresponds in thickness to the first step in the corresponding stepped end 14 and replaces the first series of layers 15 in the embodiment shown in FIG. 2.

Figure 4:
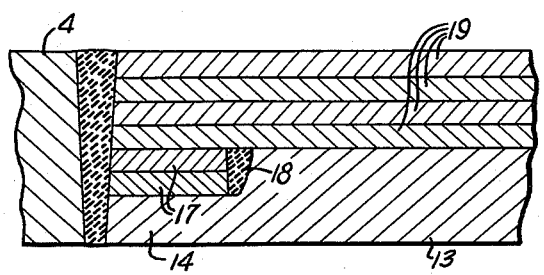
FIG. 4 is another view similar to FIGS. 2 and 3 illustrating another modification in accordance with the present invention.

Similarly in FIG. 4 the construction of shell 2 is further modified by welding the one end of the inner wall 13 directly to the lower end wall 4 and thus eliminating the corresponding first series of layers 15 of FIG. 2 and the thick inner end section 20 of the FIG. 3.

In operation the embodiment shown in FIGS. 3 and 4 generally corresponds to that shown in FIGS. 1 and 2 and no further description thereof is given.

The present invention thus provides a housing for a water-cooled reactor having a high utilization of the heat given off by the reactor while maintaining the necessary high strength in the core housing.

Various embodiments of the invention are contemplated as being within the scope of the accompanying claims which particularly point out and distinctly claim the present invention.

We claim:

1. A multi-layer reactor housing having a tubular shell closed by end members for housing a fluid-cooled atomic core, which comprises a solid innermost wall constituting a portion of the shell and adapted to be aligned with the core and having radially outwardly stepped ends, means to secure the longitudinal outermost ends of the wall to the adjacent end members to define cylindrical surfaces aligned with the upper surface of the first step, multi-layer sections encircling the cylindrical surface and welded to the adjacent axial end surfaces of the wall to define a tubular sub-assembly of lesser thickness than the completed tubular shell, and a series of outer superimposed tubular layers extending the complete length of the shell and welded to the adjacent end members.

2. A multi-layer reactor housing having a tubular shell closed by end walls for housing a fluid-cooled atomic core, which comprises a solid innermost wall constituting a portion of the shell and adapted to be aligned with the core and having radially outwardly stepped ends, a series of multi-layer end sections having an inner diameter corresponding to the diameter of the solid wall and welded to the stepped ends of the solid wall to form a portion of the tubular shell, and a series of outer superimposed tubular layers concentrically enclosing the solid wall and the end sections to form the tubular shell.

3. A multi-layer reactor housing having a tubular shell closed by end walls for housing a fluid-cooled atomic core, which comprises a solid wall constituting an innermost portion of the shell and adapted to be aligned with the core and having radially outwardly stepped ends, a first series of superimposed tubular end layers having an inner diameter corresponding to the diameter of the solid wall and welded to the outermost ends of the solid wall to form a portion of the tubular shell, a second series of superimposed tubular end layers fitted about the first series of end layers and the adjacent solid wall and welded to the solid wall, and a series of outer superimposed tubular layers concentrically enclosing the solid wall and the end layers to form the tubular shell.

4. A multi-layer reactor housing having a tubular shell closed by end members for housing a fluid-cooled atomic core, which comprises a solid wall constituting an innermost portion of the shell and adapted to be aligned with the core and having radially outwardly stepped ends, a tubular member having a thickness corresponding to the first step in the solid wall and welded to one end of the solid wall to position the solid wall adjacent the reactor core, a series of superimposed tubular end layers having an inner diameter corresponding to the diameter of the solid wall and welded to the opposite end of the solid wall, a pair of superimposed layers concentrically fitted about said tubular member and said series of superimposed tubular end layers and welded to the adjacent end surfaces of said solid wall, and a series of outer superimposed tubular layers concentrically enclosing the solid wall and the end layers to form the tubular shell.

5. A multi-layer reactor housing having a vertically arranged tubular shell closed by upper and lower end members for housing a fluid-cooled atomic core in the lower portion of the shell, which comprises a solid innermost wall constituting a portion of the shell in alignment with the core and having radially outwardly stepped upper and lower ends, a series of superimposed tubular end layers having an inner diameter corresponding to the inner diameter of the solid wall and an outer diameter corresponding to the outer diameter of the solid wall, said end layers being welded to the stepped ends of the solid wall and extending to the ends of the shell to form a portion of the tubular shell, and a series of outer superimposed tubular layers concentrically enclosing the solid wall and the end layers to form the tubular shell.

6. A multi-layer reactor housing having a tubular shell closed by end members for housing a fluid-cooled atomic core adjacent one end of the shell, which comprises a solid innermost wall constituting a portion of the shell and aligned with the core and having radially outwardly stepped ends, weld means connecting one end of the wall directly to the adjacent end member, a series of superimposed tubular end layers having an inner diameter corresponding to the diameter of the solid wall and an outer diameter corresponding to the outer surface of the first step, weld means securing the end layers to the opposite stepped end of the solid wall to form a portion of the tubular shell, successive series of multi-layer sections superimposed upon the stepped ends of the wall and projected to the ends of the shell, and a series of outer superimposed tubular layers concentrically enclosing the solid wall and the end layers to complete the tubular shell.

References Cited in the file of this patent

UNITED STATES PATENTS

| | | |
|---|---|---|
| 2,273,736 | Raymond et al. | Feb. 17, 1942 |
| 2,365,696 | Grubb | Dec. 26, 1944 |

FOREIGN PATENTS

| | | |
|---|---|---|
| 1,199,145 | France | June 15, 1959 |
| 521,979 | Great Britain | June 5, 1940 |

OTHER REFERENCES

U.S. Atomic Energy Commission, EBWR, Experimental Boiling Water Reactor. Argonne National Laboratory, May 1957, A.N.L. 5607, pp. 42–48.

Nuclear Science Abstracts, vol. 13, No. 17, September 15, 1959, page 2065, Abstract 15395 of paper "Experimental Investigation Into the Stress Distribution in a Band-Reinforced Pressure Vessel." K. G. Mantle et al.